United States Patent
Hoch

(10) Patent No.: US 11,816,298 B2
(45) Date of Patent: Nov. 14, 2023

(54) SINGLE LAYER CAPACITIVE IMAGING SENSORS

(71) Applicant: Synaptics Incorporated, San Jose, CA (US)

(72) Inventor: David Hoch, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 123 days.

(21) Appl. No.: 16/994,520

(22) Filed: Aug. 14, 2020

(65) Prior Publication Data

US 2022/0050551 A1    Feb. 17, 2022

(51) Int. Cl.
*G06F 3/044*    (2006.01)

(52) U.S. Cl.
CPC .......... *G06F 3/0443* (2019.05); *G06F 3/0448* (2019.05); *G06F 2203/04112* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0097991 A1* | 5/2006 | Hotelling | ............ | G06F 3/04166 345/173 |
| 2007/0126078 A1* | 6/2007 | Huang | ................ | H01L 27/0805 257/532 |
| 2010/0302201 A1* | 12/2010 | Ritter | .................... | G06F 3/0446 345/174 |
| 2011/0199568 A1* | 8/2011 | Morishita | ......... | G02F 1/134363 349/141 |
| 2014/0293163 A1* | 10/2014 | Ju | ......................... | G06F 3/0443 349/12 |
| 2014/0340354 A1* | 11/2014 | Liu | ........................ | G06F 3/0443 345/174 |
| 2014/0354899 A1* | 12/2014 | Cok | ...................... | G06F 3/0446 349/12 |
| 2015/0185917 A1* | 7/2015 | Song | ...................... | G06F 3/0446 427/79 |
| 2016/0188029 A1* | 6/2016 | Liu | ........................ | G06F 3/0412 345/87 |
| 2016/0349870 A1* | 12/2016 | Chang | .................... | G06F 3/0418 |
| 2016/0370661 A1* | 12/2016 | Ono | .................... | G02F 1/13624 |
| 2017/0192556 A1* | 7/2017 | Deng | ...................... | G06F 3/0418 |
| 2017/0364185 A1* | 12/2017 | Myren | .................. | G06F 3/0443 |

(Continued)

*Primary Examiner* — Towfiq Elahi
*Assistant Examiner* — Alecia D English
(74) *Attorney, Agent, or Firm* — Leydig, Voit & Mayer, Ltd.

(57) ABSTRACT

A capacitive sensing layer of an input device includes a substantially rectangular sensor pattern extending in a horizontal direction and in a vertical direction, including first and second electrodes. Each of the first electrodes includes a strip extending in the vertical direction. The first electrodes are separated in the horizontal direction by first gaps. Each of the second electrodes includes a substantially rectangular pad, disposed adjacent to one of the first electrodes, in one of the first gaps. Two of the second electrodes are disposed in each of the first gaps in the horizontal direction. The two of the second electrodes in each of the first gaps are separated by second gaps. A subset of the second electrodes are disposed in each of the first gaps, in the vertical direction. The capacitive sensing layers also includes routing traces of the second electrodes disposed in the second gaps.

18 Claims, 6 Drawing Sheets

(56) References Cited

U.S. PATENT DOCUMENTS

2018/0046276 A1* 2/2018 Hou .................... G06F 3/04166
2018/0224964 A1* 8/2018 Church ................. G06F 3/047
2019/0294274 A1* 9/2019 Cho ..................... G06F 3/0416

* cited by examiner

SINGLE LAYER CAPACITIVE IMAGING SENSORS

TECHNICAL FIELD

The described embodiments relate generally to electronic devices, and more specifically, to the patterns of single layer capacitive imaging sensors.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices are typically used in combination with other supporting components, such as display or input devices found in the electronic or computing system. In some configurations, the proximity sensor devices are coupled to these supporting components to provide a desired combined function or to provide a desirable complete device package. Proximity sensor devices utilize one or more electrical techniques to determine the presence, location and/or motion of an input object, such as a capacitive sensing technique. The proximity sensor devices often use an array of sensor electrodes arranged in a sensor pattern to detect the presence, location and/or motion of an input object.

Different designs of sensor patterns have different advantages and disadvantages. For example, various sensor patterns may be designed to reduce the number of required routing traces, which may help reduce the complexity, cost and/or size of the electrical components associated with these sensor patterns. One such sensor pattern includes columns of transmitter (Tx) electrodes and columns of receiver (Rx) electrodes with routing traces connecting the Rx and Tx electrodes disposed between the columns in close proximity. In such a sensor pattern, false detections may result when a finger covers the routing traces, causing capacitive interactions between the routing traces. Further, response characteristics may be spatially nonuniform, based on different Rx/Tx electrodes having routing traces of different lengths where interactions may occur, thereby complicating the processing of sensor signals. Other limitations of such sensor patterns may include an asymmetric coupling of the finger or other input object to the Rx electrodes vs the Tx electrodes, which may give rise to low ground mass (LGM) issues, when an input device does not have sufficient ground (e.g., when the input device is on a non-conductive insulated surface and is not connected to the ground).

Therefore, it is desirable to provide sensor patterns with more spatially uniform response characteristics, and that operate using a limited number of routing traces, while also being less susceptible to false detections and/or LGM issues.

SUMMARY

In general, in one aspect, one or more embodiments relate to a capacitive sensing layer of an input device, the capacitive sensing layer comprising: a substantially rectangular sensor pattern extending in a horizontal direction and in a vertical direction, the rectangular sensor pattern comprising: a first plurality of electrodes; wherein each of the first plurality of electrodes comprises a strip extending in the vertical direction, and wherein the first plurality of electrodes are separated in the horizontal direction by a first plurality of gaps; a second plurality of electrodes; wherein each of the second plurality of electrodes comprises a substantially rectangular pad, disposed adjacent to one of the first plurality of electrodes, in one of the first plurality of gaps, wherein two of the second plurality of electrodes are disposed in each of the first plurality of gaps in the horizontal direction, wherein the two of the second plurality of electrodes in each of the first plurality of gaps are separated by a second plurality of gaps, and wherein a subset of the second plurality of electrodes are disposed in each of the first plurality of gaps, in the vertical direction; and a plurality of routing traces of the second plurality of electrodes disposed in the second plurality of gaps.

In general, in one aspect, one or more embodiments relate to an input device, comprising: a sensing module comprising: a capacitive sensing layer comprising: a first plurality of electrodes and a second plurality of electrodes disposed on a substrate according to a substantially rectangular sensor pattern, the first plurality of electrodes and the second plurality of electrodes configured for a capacitive sensing to obtain a plurality of touch signals, wherein each of the first plurality of electrodes comprises a strip extending in the vertical direction, and wherein the first plurality of electrodes are separated in the horizontal direction by a first plurality of gaps; wherein each of the second plurality of electrodes comprises a substantially rectangular pad, disposed adjacent to one of the first plurality of electrodes, in one of the first plurality of gaps, wherein two of the second plurality of electrodes are disposed in each of the first plurality of gaps in the horizontal direction, wherein the two of the second plurality of electrodes in each of the first plurality of gaps are separated by a second plurality of gaps, and wherein a subset of the second plurality of electrodes are disposed in each of the first plurality of gaps, in the vertical direction; and a plurality of routing traces of the second plurality of electrodes disposed in the second plurality of gaps; and a touch sensing interface interfaced with the first plurality of electrodes and the routing traces of the second plurality of electrodes, the touch sensing interface configured to generate a touch output signal by processing the plurality of touch signals.

In general, in one aspect, one or more embodiments relate to a method for operating an input device, wherein the input device comprises: a capacitive sensing layer comprising: a first plurality of electrodes, a second plurality of electrodes, and a third plurality of electrodes, in a substantially rectangular sensor pattern, wherein each of the first plurality of electrodes comprises a strip extending in the vertical direction, and wherein the first plurality of electrodes are separated in the horizontal direction by a plurality of gaps; wherein each of the second plurality of electrodes comprises a substantially rectangular pad, disposed adjacent to one of the first plurality of electrodes, in one of the plurality of gaps, wherein two of the second plurality of electrodes are disposed in each of the plurality of gaps in the horizontal direction, and wherein a subset of the second plurality of electrodes are disposed in each of the plurality of gaps, in the vertical direction wherein the third plurality of electrodes is disposed between the second plurality of electrodes in the vertical direction; and the method comprising: obtaining a low ground mass component by performing a first transcapacitance sensing between two of the second plurality of electrodes separated by one of the third plurality of electrodes; obtaining touch signals by performing a second transcapacitance sensing between the first plurality of electrodes and the second plurality of electrodes; adjusting the touch signals using the low ground mass components; and generating a touch output signal by processing the plurality of touch signals.

Other aspects of the embodiments will be apparent from the following description and the appended claims.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosure provide input devices and methods using single layer capacitive imaging sensors. A single layer capacitive imaging sensor, in accordance with one or more embodiments, is based on sensor patterns as described below. The sensor patterns may offer various advantages including providing a good spatial resolution while limiting the number of required routing traces, thereby reducing complexity, space requirements, and/or cost. Further, the sensor patterns in accordance with one or more embodiments, may be less susceptible to erroneous detections of a touch, and may have good low ground mass (LGM) characteristics and spatially uniform response characteristics. Each of these aspects is discussed in detail below.

Figure 1:
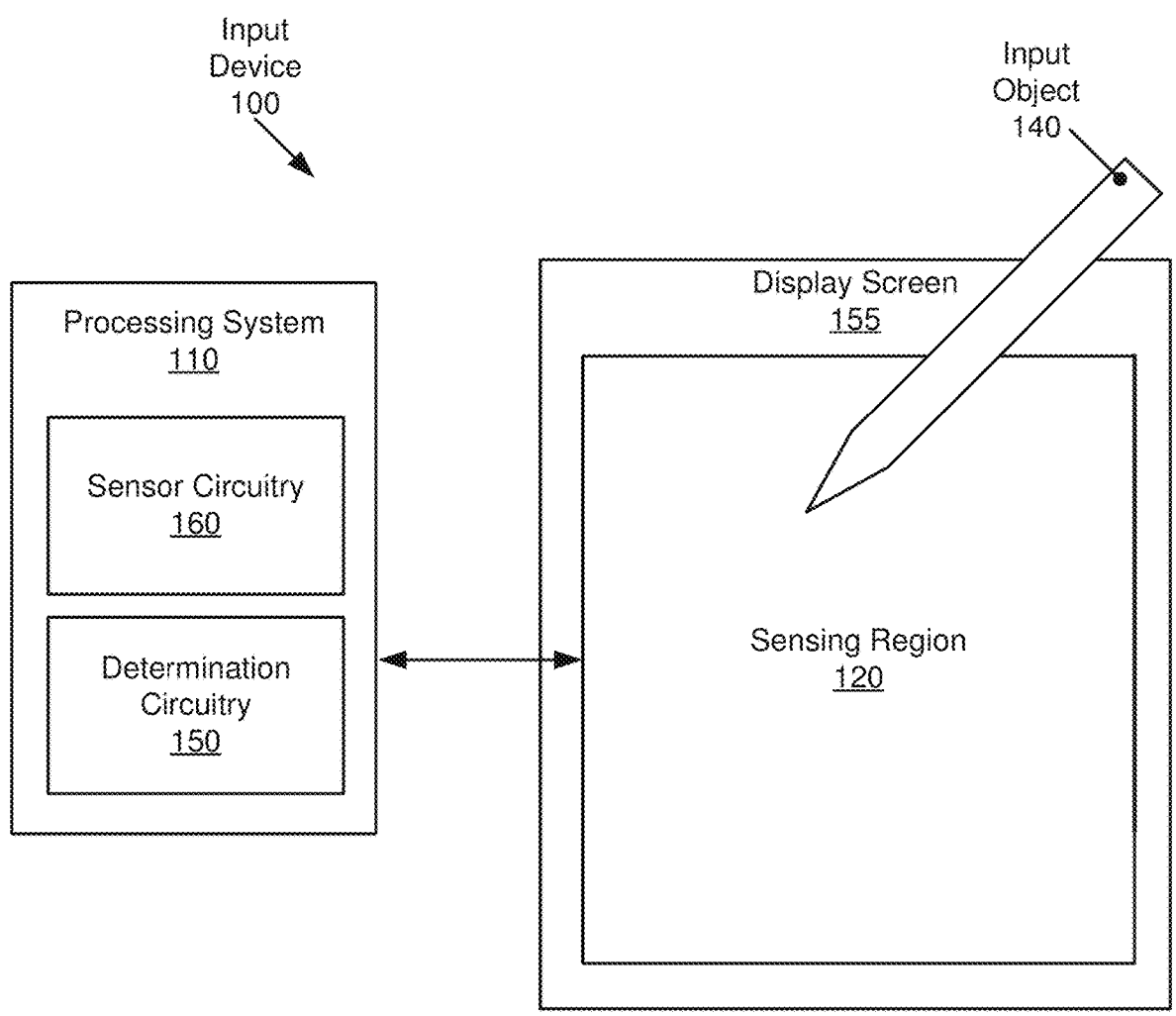
FIG. 1 shows a block diagram of an input device combined with a display device, in accordance with one or more embodiments.

FIG. 1 is a block diagram of an example of an input device (100), in accordance with one or more embodiments. The input device (100) may be configured to provide input to an electronic system (not shown). As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, smart phones, personal digital assistants (PDAs), gaming devices, automotive infotainment systems, etc.

In FIG. 1, the input device (100) is shown as a proximity sensor device (e.g., "touchpad" or a "touchscreen") configured to sense input provided by one or more input objects (140) in a sensing region (120). Example input objects include styli, an active pen, and fingers. Further, which particular input objects are in the sensing region may change over the course of one or more gestures.

The sensing region (120) encompasses any space above, around, in and/or near the input device (100) in which the input device (100) is able to detect user input (e.g., user input provided by one or more input objects). The sizes, shapes, and locations of particular sensing regions may vary widely from embodiment to embodiment.

The input device (100) may utilize any combination of sensor components and sensing technologies to detect user input in the sensing region (120). The input device (100) includes one or more sensing elements for detecting user input. As a non-limiting example, the input device (100) may use capacitive techniques.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter", Tx) and one or more receiver sensor electrodes (also "receiver electrodes" or "receiver", Rx). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments, the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like.

The processing system (110) may be implemented as a set of modules that handle different functions of the processing system (110). For example, the processing system (110) may include determination circuitry (150) to determine when at least one input object is in a sensing region, determine signal to noise ratio, determine positional information of an input object, identify a gesture, determine an action to perform based on the gesture, a combination of gestures or other information, and/or perform other operations. The modules may include hardware and/or software which may execute on a processor.

The sensor circuitry (160) may include functionality to drive the sensing elements to transmit transmitter signals and receive the resulting signals. For example, the sensor circuitry (160) may include sensory circuitry that is coupled to the sensing elements. The sensor circuitry (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows determination circuitry (150) and a sensor circuitry (160), alternative or additional modules may exist in accordance with one or more embodiments. Example alternative or additional modules include hardware operation modules for operating hardware such as sensor electrodes and display screens (155), data processing modules for processing data such as sensor signals and positional information, reporting modules for reporting information, and identification modules configured to identify gestures, such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

In some embodiments, the input device (100) includes a touch screen interface, and the sensing region (120) overlaps at least part of an active area of a display screen (155). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), microLED, liquid crystal display (LCD), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

While FIG. 1 shows a configuration of components, other configurations may be used without departing from the scope of the invention. For example, various components may be combined to create a single component. As another example, the functionality performed by a single component may be performed by two or more components.

Figure 2:
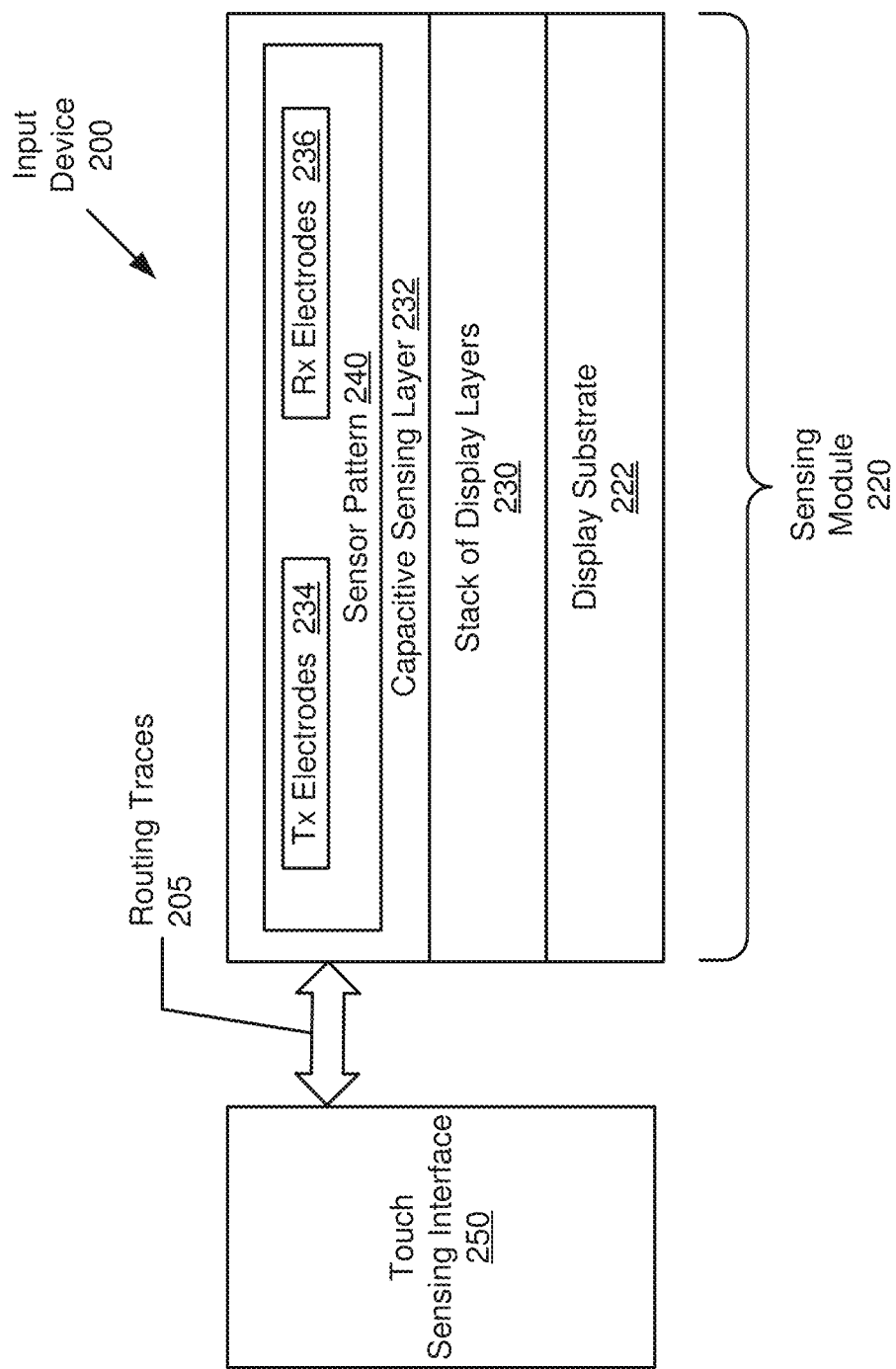
FIG. 2 shows a block diagram of a sensing module in an input device combined with a display device in accordance with one or more embodiments.

FIG. 2 shows an input device (200) in accordance with one or more embodiments. As shown in FIG. 2, the input device (200) includes a sensing module (220) coupled to a touch sensing interface (250) via routing traces (205). The sensing module (220) may be used to implement all or a part of the sensing region (120), discussed above in reference to FIG. 1. The sensing module (220) may also be used to generate a display for all or part of the display screen (155), also discussed above in reference to FIG. 1. Further, the touch sensing interface (250) may include circuits which may be a component of the processing system (110), for example, the sensor circuitry (160) and/or the determination circuitry (150), discussed above in reference to FIG. 1.

In one or more embodiments, the sensing module (220) includes multiple layers including a stack of display layers (230) (e.g., the layers of the display screen), a capacitive sensing layers (232), and a display substrate (222). The stack of display layers (230) may be disposed on the display substrate (222). In one embodiment, the display substrate (222) is a rigid or flexible plastic or glass substrate or another substrate. The sensing module (220) may have additional layers and components. Alternatively, no display layers may be present in a pure touch sensing implementation.

In one or more embodiments, multiple transmitter (Tx) (234) and/or receiver (Rx) (236) electrodes are disposed in the capacitive sensing layer (232). The Tx (234) and/or Rx (236) electrodes may be used in capacitance sensing (e.g., absolute capacitance sensing, mutual capacitance sensing, etc.). The Tx (234) and/or Rx (236) electrodes, in one or more embodiments, are organized in a sensor pattern (240). The sensor pattern (240) may implement a matrix pad sensor with a metal mesh providing numerous sensing pads and routing traces connecting to the sensing pads across the sensing region. Various sensor patterns are discussed below, with reference to FIGS. 3, 4, and 5. While in FIG. 2, the capacitive sensing layer (232) is shown in a location on top of the stack of display layers (230), those skilled in the art will appreciate that the capacitive sensing layer (232) may be located anywhere, relative to the stack of display layers (230).

In one or more embodiments, the Tx electrodes (234) and the Rx electrodes (236), together, implement mutual capacitance or transcapacitance sensing. In other words, a waveform is driven onto the Tx electrodes (234) and a resulting signal(s) is received from the Rx electrodes (236). The resulting signal is a function of the waveform and change in capacitance between the Tx electrodes and Rx electrodes (234, 236) due to the presence of an input object.

In one or more embodiments, the Rx electrodes (236) are operated to perform absolute capacitance sensing independent of the Tx electrodes (234). In one or more embodiments, the Tx electrodes (234) are operated to perform absolute capacitance sensing independent of the receiver electrodes (236).

The routing traces (205) may interface the Tx electrodes (234) and the Rx electrodes (236) with the touch sensing interface (250). The routing traces may be disposed on a flexible printed circuit (not shown) or other printed circuit board (PCB). No additional PCB may be necessary if the touch sensing interface (250) or a part of the touch sensing interface) is disposed directly on the display substrate (222).

The touch sensing interface (250) may be configured to perform capacitance sensing. The touch sensing interface (250) may drive electrodes (e.g., the Tx electrodes (234) or a subset of the Tx electrodes (234)), and may receive resulting signals from electrodes (e.g., from the Rx electrodes (236) or a subset of the Rx electrodes (236)) via the routing traces (205), to determine the presence and/or position of an input object (e.g., input object (140), discussed above in reference to FIG. 1).

Figure 3:
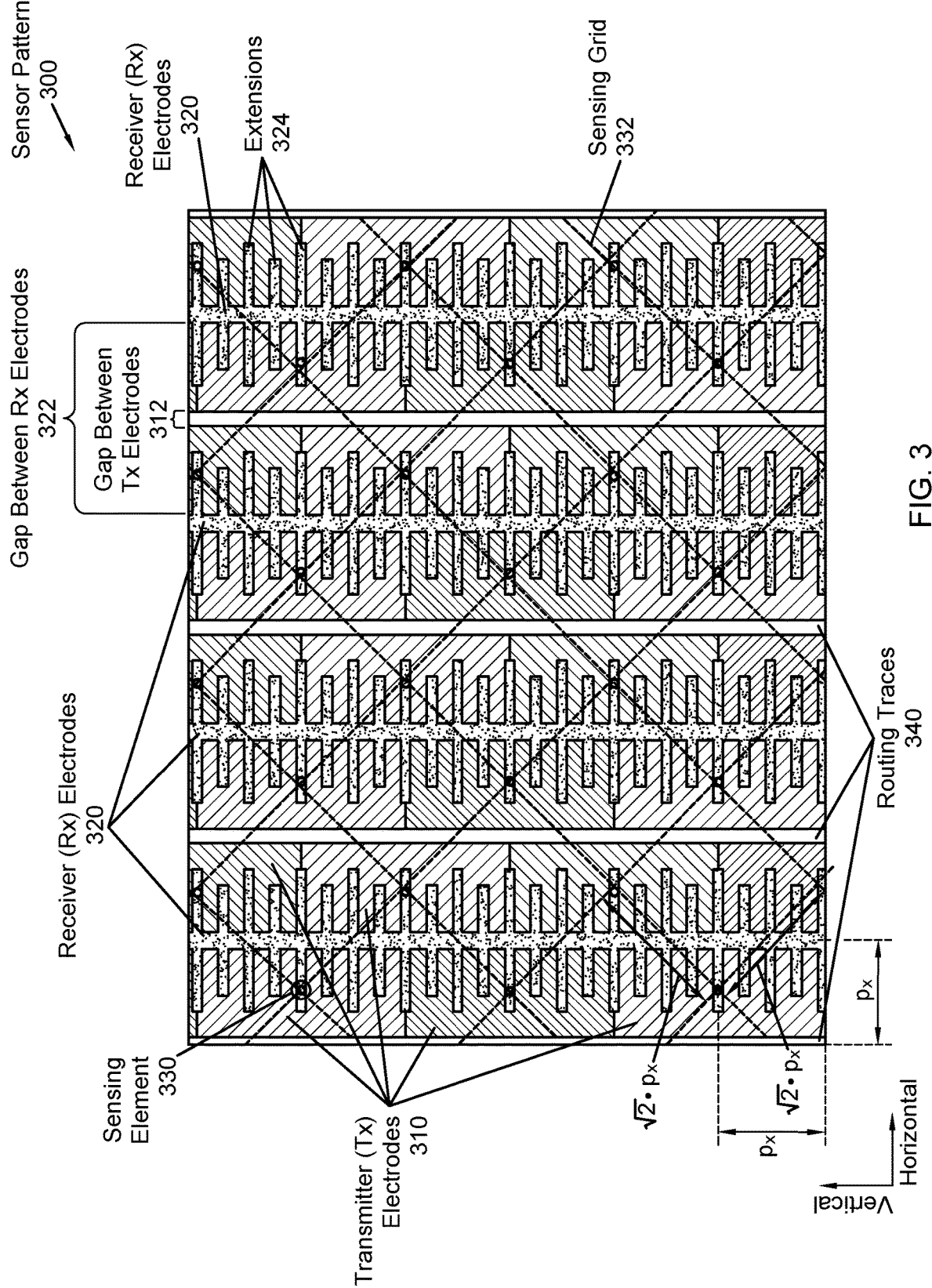
FIG. 3 shows a sensor pattern in accordance with one or more embodiments.

FIG. 3 shows a sensor pattern in accordance with one or more embodiments. The sensor pattern (300) is one of the sensor patterns that may be used in the input device (200) of FIG. 2. The first paragraphs of the following discussion describe the general design of a single layer sensor pattern for capacitive sensing in accordance with one or more embodiments, followed by a discussion of elements that are specific to the embodiment shown in FIG. 3.

In one or more embodiments, sensor electrodes, including transmitter (Tx) electrodes (310) and receiver (Rx) electrodes (320), are arranged in the sensor pattern (300). In various embodiments, the Tx electrodes (310) and Rx electrodes (320) may be formed in an array on the surface of a substrate (not shown) by first forming a blanket conductive layer on the surface of the substrate and then performing an etching and/or patterning process (e.g., lithography and wet etch, laser ablation, etc.) that ohmically isolates each of the Tx electrodes (310) and Rx electrodes (320) from each other. In other embodiments, the sensor electrodes may be patterned using deposition and screen-printing methods. In one example, the blanket conductive layer used to form the Tx electrodes (310) and Rx electrodes (320) includes a thin metal layer (e.g., copper, aluminum, etc.) or a thin transparent conductive oxide layer (e.g., ATO, ITO, Zinc oxide) that is deposited using conventional deposition techniques known in the art (e.g., PVD, CVD). In one or more of the embodiments described herein, the sensor electrodes are formed from a material that is substantially optically clear, and thus, in some configurations, can be disposed between a display device and the input device user.

The areas of localized capacitive coupling formed between at least a portion of a Tx electrode (310) and a Rx electrode (320) may be termed a "capacitive pixel," or also referred to herein as the sensing element (330) organized in a sensing grid (332). The sensing element (330) identified in FIG. 3, for example, may be a result of an electric field in a capacitive coupling between the top left Tx electrode (310), and the leftmost Rx electrode (320). The location shown for the sensing element (330) indicates the center of the sensing element. Those skilled in the art will appreciate that the sensing element extends in 2D space, and is not limited to a point. For example, a sensing element extends to an adjacent sensing element, as indicated by the sensing grid (332). As the proximity and motion of input objects across the sensing region changes, the capacitive coupling changes, thus enabling a detection of the input object.

In one or more embodiments, the sensing elements (330) are "scanned" to determine the capacitive couplings. The resulting signals may be used to determine measurements of the capacitive couplings at the sensing elements (330), which are used to determine whether an input object is present and its positional information, as discussed above. A set of values for the sensing elements (330) form a "capacitive image" (also "sensing image") representative of the capacitive couplings at the sensing elements. In one or more embodiments, the sensing image, or capacitive image, includes data received during a process of measuring the resulting signals received with at least a portion of the sensing elements (330) distributed across the sensing region (120). The resulting signals may be received at one instant in time, or by scanning the rows and/or columns of sensing elements distributed across the sensing region (120) in a raster scanning pattern (e.g., serially polling each sensing element separately in a desired scanning pattern), row-by-row scanning pattern, column-by-column scanning pattern or other useful scanning technique.

Regarding the geometry of the sensor pattern (300) shown in FIG. 3, the sensor pattern (300) is substantially rectangular, for example in the shape of the sensing region (120). The sensor pattern (300) may extend beyond the section shown in FIG. 3, as the illustrated pattern keeps repeating.

To describe various features of the sensor pattern (300), a two-dimensional cartesian reference frame with a horizontal direction and a vertical direction is used. The sensor pattern (300) may have any orientation relative to a world reference frame, and the terms "horizontal" and "vertical" are merely used to establish a reference frame facilitating the discussion.

In the example of FIG. 3, the sensor pattern (300) include four Rx electrodes (320). Each of the Rx electrodes (320) includes a strip extending in the vertical direction. The Rx electrodes (320) may be equidistantly spaced, establishing gaps (322) between the Rx electrodes (320). Each Rx electrode (320) may further include extensions (324) in a horizontal direction, as illustrated in FIG. 3. The role of the extensions is discussed below.

In the example of FIG. 3, the sensor pattern (300) further includes Tx electrodes (310) disposed in the gap between the Rx electrodes (320), adjacent to the Rx electrodes (320). Tx electrodes (310) may be disposed adjacent to the strip of an Rx electrode (320) in columns, on both sides of the strip of the Rx electrode. As Tx electrodes (310) are disposed adjacent to multiple Rx electrodes (320), two Tx electrodes (310) may be in the gap (322) between two Rx electrodes (320), in the horizontal direction. If the Rx electrodes (320) are equipped with extensions (324), the corresponding Tx electrodes (310) may be equipped with cutouts in the rectangular pads to accommodate the extensions. As previously discussed, the combination of one Rx electrode (320) and one Tx electrode (310) may form a sensing element (330). The extensions (324) may be present to improve the sensing characteristics of the sensing element (330) by broadening the zone in which capacitance changes may be detected in presence of an input object, and further to increase the transcapacitance change as an input object is present vs absent.

While not explicitly shown in FIG. 3, those skilled in the art will appreciate that the Rx electrodes (320) and the Tx electrodes (310) are ohmically insulated from each other, for example, by a small gap between adjacent electrodes. Also, while certain electrodes are described as transmitter (Tx) electrodes and other electrodes are described as receiver (Rx) electrodes, those skilled in the art will appreciate that whether a specific electrode operates as a transmitter and/or a receive electrodes may change, depending on how the electrode is operated.

Each of the Tx electrodes (310) may be formed by a substantially rectangular pad with a pitch $p_x$. The rectangular pad may be elongated in the vertical direction. In one embodiment, the height (in the vertical direction) is twice the width (in the horizontal direction), $p_x$, of the rectangular pad. In other words, the Tx pads are of size $p_x \times 2p_x$. Further, the spacing between two adjacent Rx electrodes is substantially $2p_x$. The Tx electrode pad size of $p_x \times 2p_x$ may be extended without departing from the disclosure. For example, $p_x \times 3p_x$, $p_x \times 2p_x$ and $p_x \times p_x$ formats may be used.

In one embodiment, Tx electrodes (310) on opposite sides of an Rx electrode (320) have an offset in the vertical direction. As shown in FIG. 3, the offset may be 50%. Alternatively, while not shown, there may be no offset. The offset, in combination with the vertically elongated shape of the Tx electrodes (310) may result in a rotation of the sensing grid (332) relative to the horizontal/vertical axes of the sensor pattern (300). For the sensor pattern (300) of FIG. 3, the sensing grid (332) is a Cartesian sensing grid, rotated by 45 degrees relative to the horizontal/vertical directions of the sensor pattern (300). As a result of the rotation of the sensing grid (332) the sensing elements (330) are spaced more tightly in horizontal and vertical directions in comparison to a non-rotated sensing grid with the same number of Tx/Rx electrodes. Assume, for example, that a conventional pattern with a non-rotated sensing grid uses a $p_x=4.2$ mm pitch. Using the sensor pattern (300) would translate into a pitch of $$\tilde{p}_x = 2 \cdot \frac{p_x}{\sqrt{2}} \sim 6 \text{ mm}$$

(which corresponds to a horizontal distance between two neighboring Rx-columns) to achieve a similar spatial resolution. Assuming an active area of 134.5 mm in the horizontal x-direction, this would lead to 32 columns for the conventional pattern, while the sensor pattern (300) would require only 22-23 columns. Accordingly, savings of over 40% (more precisely:

$$\left(\frac{2}{\sqrt{2}} - 1\right) \cdot 100\%)$$

in Rx channels and associated routing traces compared to conventional patterns may be accomplished.

In one or more embodiments, each of the Tx electrodes (310) and Rx electrodes (320) is equipped with a routing trace to electrically interface the electrode with the touch sensing interface (250). The routing traces associated with the Rx electrodes (320) may interface with the Rx electrodes (320) at the top or bottom edge of the sensor pattern. For simplicity, the routing traces associated with the Rx electrodes (320) are not shown. The routing traces (340) associated with the Tx electrodes (310) are routed in parallel bundles within the gap (312) between the Tx electrodes (310) to exit at the top of bottom edge of the sensor pattern. To accommodate 16 routing traces, a routing space of 400 μm may be necessary. A 400 μm gap (312) or even a wider gap, e.g., an 800 μm gap, may still be sufficiently small to not unacceptably interfere with the touch resolution of the sensor pattern (300).

Based on the described routing scheme, routing traces associated with Rx electrodes (320) are spatially separate from routing traces associated with Tx electrodes (310), unlike in some of the conventional sensor pattern designs, thereby reducing the risk of false detections (phantom fingers), and improving the linearity of the sensor pattern.

The separation between Tx and Rx routing traces reduces or eliminates possible capacitive interference, which could result in erroneous touch output signals, in particularly in presence of an input object. Further, the sensor pattern (300) also provides superior performance in presence of low ground mass (LGM) conditions. An LGM condition may be present when an input device does not have sufficient ground (e.g., when the input device is on a non-conductive insulated surface and is not connected to the ground). In such cases, the trans-capacitive touch signals develop a dip, which intensifies with larger finger size. If left uncorrected, this may cause wrong position reporting and/or phantom fingers in the touch detection. LGM conditions may be particularly pronounced when the stackup (of the layers of a touch-display assembly) is very thin. Further, while larger devices (such as laptops) may provide a significant self capacitance, in smaller devices (such as smartphones) there may be less self capacitance, thereby causing an LGM condition when the device is poorly grounded. When a transcapacitance sensing is performed between a Tx electrode (310) and an Rx electrode (320), the change of the transcapacitance, $\Delta C_T$, resulting from the presence/absence of an input object typically is the variable of interest. However, when performing a transcapacitance sensing, other parasitic capacitances are measured, in addition. Specifically, a capacitance associated with the LGM condition, $C_{LGM}$, subtractivey affects $\Delta C_T$. LGM terms typically interact with both the Tx electrode (310) and the Rx electrode (320). Accordingly, small interactions with the Tx and Rx electrodes may be desirable. In the sensor pattern (300), the main Rx column is a straight line, making the finger coupling to the Rx potentially smaller than in other conventional sensor patterns (where the Rx column may not be a straight line). Accordingly, the sensor pattern (310) reduces LGM issues, in comparison to conventional sensor patterns.

Figure 4:
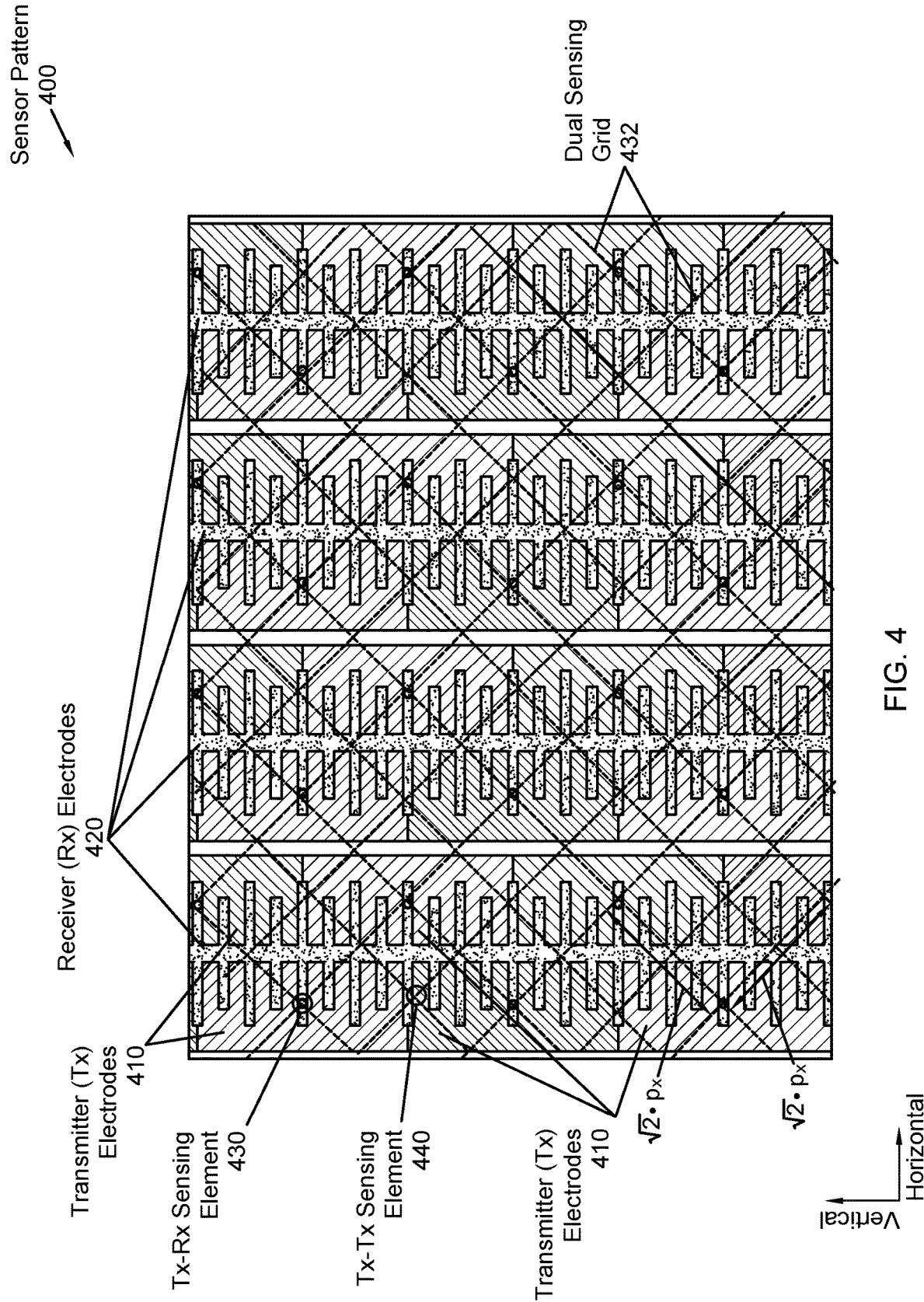
FIG. 4 shows a sensor pattern in accordance with one or more embodiments.

FIG. 4 shows a sensor pattern in accordance with one or more embodiments. The physical design of the sensor pattern (400) is identical to the physical design of the sensor pattern (300) of FIG. 3. In one or more embodiments, sensor electrodes, including transmitter (Tx) electrodes (410) and receiver (Rx) electrodes (420), are arranged in the sensor pattern (400).

The areas of localized capacitive coupling formed between at least a portion of a Tx electrode (410) and/or an Rx electrodes (420) may be termed a "capacitive pixel," or also referred to herein as the sensing element (430, 440) organized in a dual sensing grid (432). In comparison to the sensing grid (432), the spatial resolution of the dual sensing grid (432) is doubled. More specifically, the dotted lines of the dual sensing grid (432) indicate the primary sensing grid as initially described with reference to FIG. 3. The dashed lines indicate the added secondary sensing grid which doubles the resolution. The part of the dual sensing grid (432) indicated by the dotted lines is a result of a transcapacitance sensing performed between a Tx electrode (310), and an Rx electrode (320). One resulting Tx-Rx sensing element (430) is indicated in FIG. 4. The secondary sensing grid indicated by the dashed lines is a result of an additional transcapacitance sensing performed between a Tx electrode (410) and another vertically adjacent Tx electrode (410). One resulting Tx-Tx sensing element (440) is indicated in FIG. 4. Accordingly, by performing an additional transcapacitance sensing between adjacent Tx electrodes, the spatial resolution of the sensor pattern (400) is effectively doubled using the same sensor pattern. Due to the different geometries, a touch signal obtained from a Tx-Tx sensing element (440) may require a different processing than a touch signal obtained from a Tx-Rx sensing element (430). Further, because, for the Tx-Tx sensing element (440), a routing trace of the one Tx electrode repurposed to perform as an Rx electrode may be directly adjacent to the routing trace of the other Tx electrode (operating as a Tx electrode), a false detection of an input object may thus occur by sensing elements of the secondary sensor grid due to the proximity of these routing traces, e.g., when an input object is near these routing traces, but not near the electrodes. To detect and eliminate such false detections, the touch signals obtained from adjacent sensing elements of the primary sensor grid may be considered. If the touch signals from adjacent sensing elements do not confirm the presence of the input object, the detection is deemed likely a false detection. The false detection may be then ignored.

Figure 5:
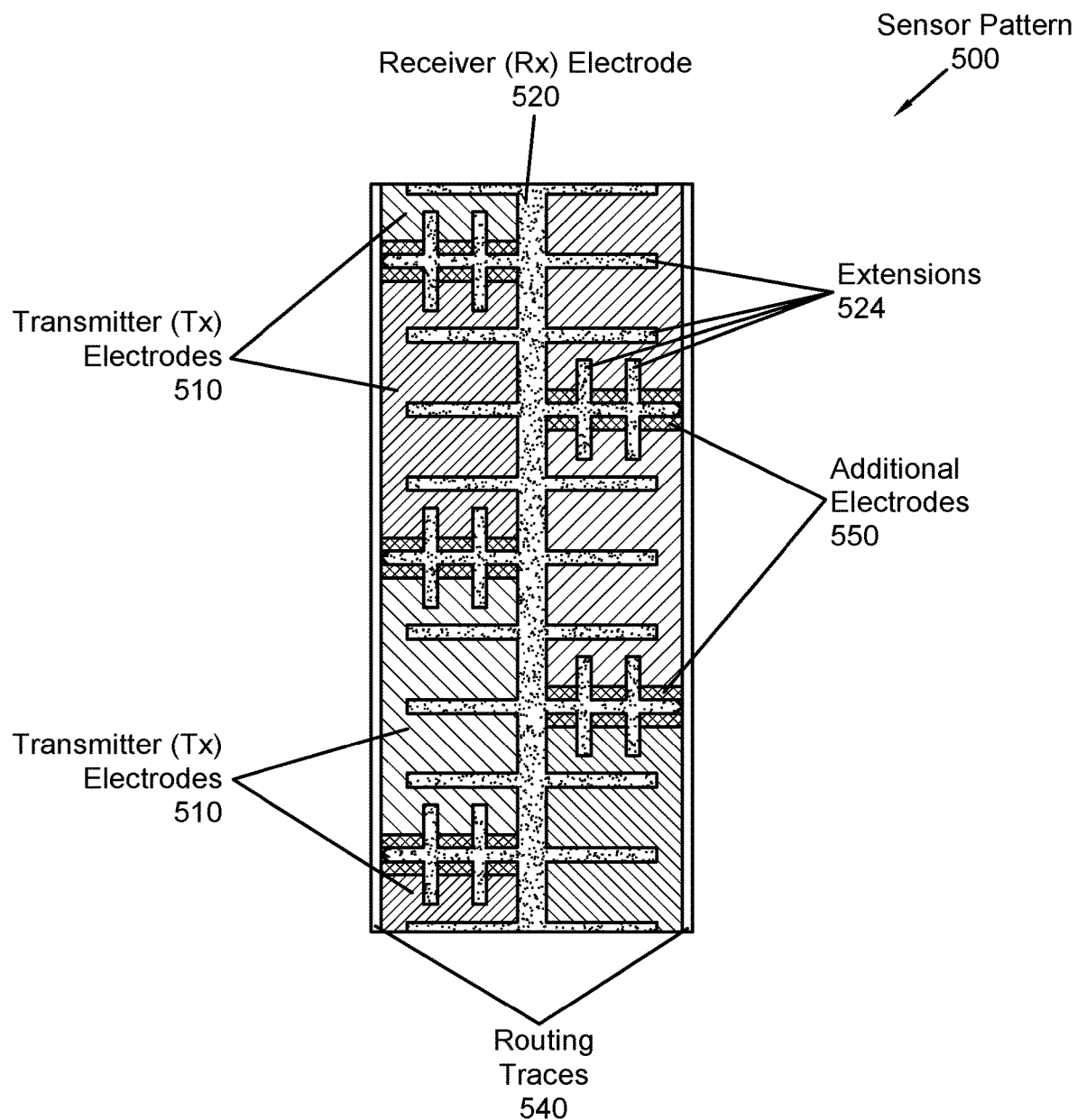
FIG. 5 shows a sensor pattern in accordance with one or more embodiments.

FIG. 5 shows a sensor pattern in accordance with one or more embodiments. The physical design of the sensor pattern (500) is related to the physical design of the sensor pattern (300) of FIG. 3. In one or more embodiments, sensor electrodes, including transmitter (Tx) electrodes (510) and receiver (Rx) electrodes (520), are arranged in the sensor pattern (500). While FIG. 5 shows only a single Rx electrode (520) with adjacent Tx electrodes (510), those skilled in the art will appreciate that the sensor pattern (500) may be repeated, analogous to the sensor pattern (300) in FIG. 3.

In one or more embodiments, the sensor pattern (500) includes additional electrodes (550) disposed between the Tx electrodes (510), to establish a vertical separation of the Tx electrodes (510). The additional electrodes (510) may be placed to also accommodate extensions (524) of the Rx electrodes (520). The additional electrodes (510) may be floating, or they may be set to a specific potential, e.g., a ground potential. Routing traces (not shown) associated with the additional electrodes (550) may follow the routing traces (540) of the Tx electrodes (510). In one or more embodiments, the sensor pattern (500) enables an additional sensing, between vertically adjacent Tx electrodes (510) that are separated by an additional electrode (550). Because the Tx electrodes (510) used in the additional sensing are separated by the additional electrodes (550), the change of the transcapacitance in good grounded condition, $\Delta C_T$, resulting from the presence/absence of an input object is relatively small, in particular when the additional electrodes (550) are held to a ground potential. As previously discussed, when performing a transcapacitance sensing under LGM conditions, other parasitic capacitances are measured, in addition. Specifically, $C_{LGM}$, which subtractively affects $\Delta C_T$, is also measured. Accordingly, with $\Delta C_T$ being small when performing the additional sensing, $C_{LGM}$ may be identified. Subsequently, the now known $C_{LGM}$ may be used to compensate for the parasitic $C_{LGM}$ term in a transcapacitance sensing between a Tx electrode (510) and an Rx electrode (520). Additional details regarding transcapacitance sensing under LGM conditions are provided in U.S. Pat. No. 9,791,970, the entire disclosure of which is hereby expressly incorporated by reference herein.

Figure 6:
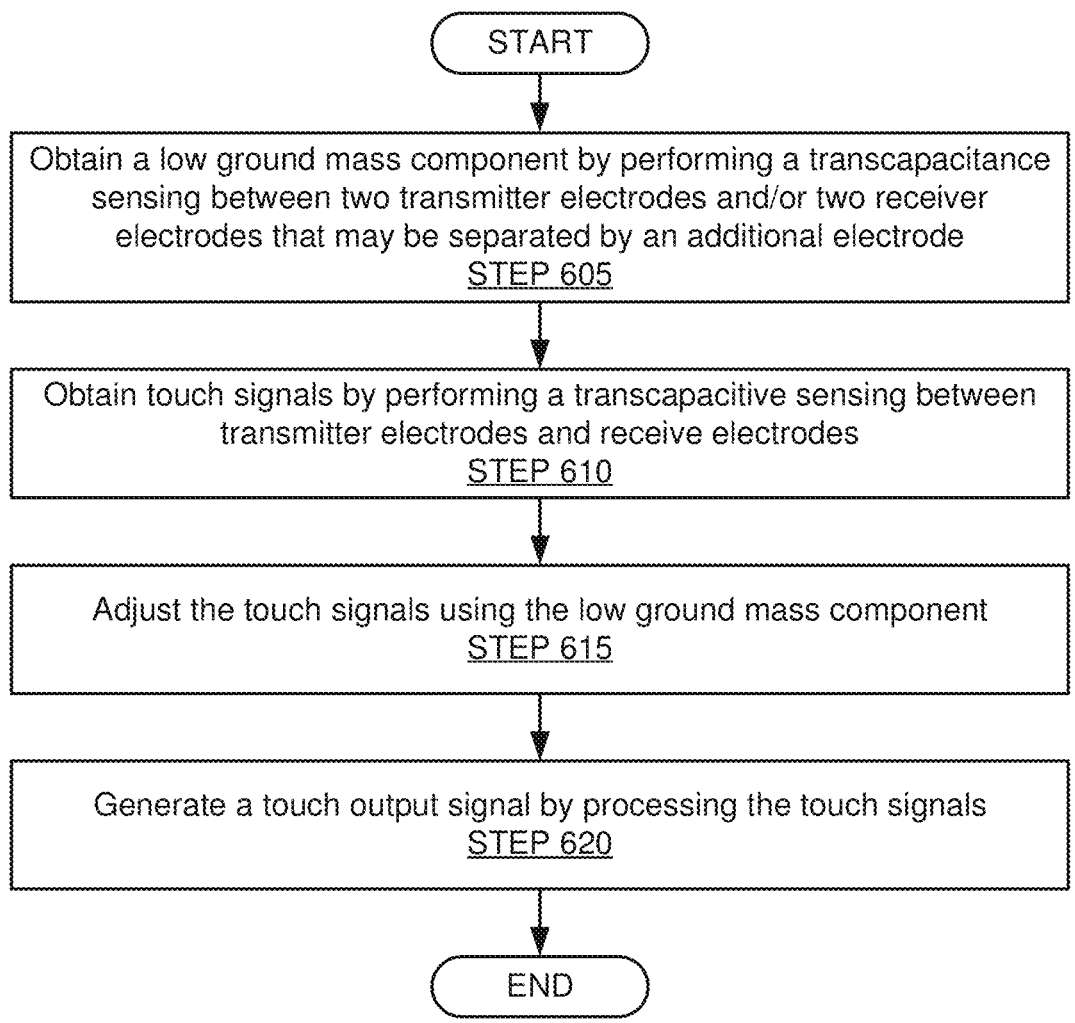
FIG. 6 shows a flowchart in accordance with one or more embodiments.

FIG. 6 shows a flowchart in accordance with one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 6.

Turning to FIG. 6, a flowchart in accordance with one or more embodiments is shown. The flowchart of FIG. 6 depicts a method for operating an input device. One or more of the steps in FIG. 6 may be performed by the components of the input device (200), discussed above in reference to FIGS. 2, 3, 4, and 5.

In STEP 605, a low ground mass (LGM) term is obtained by performing a transcapacitance sensing between two Tx electrodes and/or two Rx electrodes that may be spatially separated by an additional electrode. The details of STEP 605 are described with reference to FIG. 5. STEP 605 may be performed for a single, multiple or all pairs of vertically adjacent transmitter electrodes of the sensor pattern. Additional measurements between adjacent Rx electrodes may also be performed, dependent on what detailed technique of the correction algorithm is being pursued and what sensing options are available in the specific system under consideration.

In STEP 610, touch signals are obtained by performing a transcapacitance sensing between Tx electrodes and Rx electrodes. The details of STEP 610 are described with reference to FIG. 3. STEP 610 may be performed to obtain a touch signal for a single, multiple or all sensing elements of the sensor pattern.

In STEP 615, the touch signals are adjusted using the LGM component. The adjustment may be performed by a subtraction of the LGM component. The details of STEP 615 are described with reference to FIG. 5.

In STEP 620, a touch output signal is generated by processing the touch signals to identify a touch of an input object, a gesture, determine an action to perform based on the gesture, a combination of gestures or other information, as previously discussed with reference to FIGS. 1 and 2.

Additional details regarding STEPS 605-620 are provided with regard to FIGS. 1-5, where the corresponding components and possible variations of the steps are described. The method of FIG. 6 may be repeated, e.g., at a fixed rate to provide periodically updated touch outputs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A capacitive sensing layer of an input device, the capacitive sensing layer comprising:
   a substantially rectangular sensor pattern extending in a horizontal direction and in a vertical direction, the rectangular sensor pattern comprising:
      a first plurality of electrodes;
         wherein each of the first plurality of electrodes comprises a strip extending in the vertical direction,
         wherein the first plurality of electrodes is separated in the horizontal direction by a first plurality of gaps, and
         wherein the first plurality of electrodes comprises sensing elements with multiple horizontal lengths and vertical extensions;
      a second plurality of electrodes;
         wherein each of the second plurality of electrodes comprises a substantially rectangular pad, disposed adjacent to one of the first plurality of electrodes, in one of the first plurality of gaps,
         wherein two of the second plurality of electrodes are disposed horizontally in each of the first plurality of gaps in the horizontal direction,
         wherein the two of the second plurality of electrodes in each of the first plurality of gaps are separated by a second plurality of gaps,
         wherein a subset of the second plurality of electrodes is disposed in each of the first plurality of gaps, in the vertical direction, and
         wherein the second plurality of electrodes are separated by a third plurality of gaps in the horizontal direction and into which are disposed the first plurality of electrodes; and
      a plurality of routing traces of the second plurality of electrodes disposed in the second plurality of gaps,
         wherein the first and second plurality of electrodes and the plurality of routing traces are disposed in a same layer of the substantially rectangular sensor pattern,
         wherein an electrode of the second plurality of electrodes comprises a height in the vertical direction that is an integer multiple of a length in the horizontal direction of the electrode,
         wherein the first plurality of electrodes and the second plurality of electrodes establishes a sensing grid, and
         wherein the sensing grid is rotated with respect to the horizontal direction and the vertical direction.

2. The capacitive sensing layer of claim 1, wherein the substantially rectangular pad of each of the second plurality of electrodes is elongated in the vertical direction.

3. The capacitive sensing layer of claim 2, wherein a height of the substantially regular pad in the vertical direction is twice a width of the substantially regular pad in the horizontal direction.

4. The capacitive sensing layer of claim 1, wherein the two of the second plurality of electrodes have an offset in the vertical direction.

5. The capacitive sensing layer of claim 4, wherein the offset is 50%.

6. The capacitive sensing layer of claim 1,
   wherein each of the first plurality of electrodes comprises first extensions in the horizontal direction, and
   wherein each of the second plurality of electrodes comprises cutouts corresponding to the first extensions.

7. The capacitive sensing layer of claim 6,
   wherein each of the first plurality of electrodes comprises second extensions in the vertical direction, the second extensions disposed on the first extensions.

8. The capacitive sensing layer of claim 1, further comprising:
   a third plurality of electrodes disposed between the second plurality of electrodes in the vertical direction.

9. An input device, comprising:
   a sensing module comprising:
      a capacitive sensing layer comprising:
         a first plurality of electrodes and a second plurality of electrodes disposed on a substrate according to a substantially rectangular sensor pattern,
         the first plurality of electrodes and the second plurality of electrodes configured for a capacitive sensing to obtain a plurality of touch signals,
         wherein each of the first plurality of electrodes comprises a strip extending in the vertical direction, and
         wherein the first plurality of electrodes is separated in the horizontal direction by a first plurality of gaps,
         wherein the first plurality of electrodes comprises sensing elements with multiple horizontal lengths and with vertical extensions,
         wherein each of the second plurality of electrodes comprises a substantially rectangular pad, disposed adjacent to one of the first plurality of electrodes, in one of the first plurality of gaps,
         wherein two of the second plurality of electrodes are disposed horizontally in each of the first plurality of gaps in the horizontal direction,
         wherein the two of the second plurality of electrodes in each of the first plurality of gaps are separated by a second plurality of gaps,
         wherein a subset of the second plurality of electrodes is disposed in each of the first plurality of gaps, in the vertical direction, and
         wherein the second plurality of electrodes are separated by a third plurality of gaps in the horizontal direction and into which are disposed the first plurality of electrodes; and a plurality of routing traces of the second plurality of electrodes disposed in the second plurality of gaps, wherein the first and second plurality of electrodes and the plurality of routing traces are disposed in a same layer of the substantially rectangular sensor pattern, wherein an electrode of the second plurality of electrodes comprises a height in the vertical direction that is an integer multiple of a length in the horizontal direction of the electrode, wherein the first plurality of electrodes and the second plurality of electrodes establishes a sensing grid, and wherein the sensing grid is rotated with respect to the horizontal direction and the vertical direction; and a touch sensing interface interfaced with the first plurality of electrodes and the routing traces of the second plurality of electrodes, the touch sensing interface configured to generate a touch output signal by processing the plurality of touch signals.

10. The input device of claim 9, wherein obtaining the touch output signal comprises performing a first transcapacitance sensing between the first plurality of electrodes and the second plurality of electrodes, the first transcapacitance sensing comprising:

driving, by the touch sensing interface, the second plurality of electrodes configured to operate as transmitter electrodes;

receiving, by the touch sensing interface, from the first plurality of electrodes configured to operate as receiver electrodes in a first transcapacitance sensing configuration, the plurality of touch signals.

11. The input device of claim 10, wherein a resolution of the sensing grid is doubled by performing a second transcapacitance sensing in addition to the first transcapacitance sensing, wherein the second transcapacitance sensing is performed between vertically adjacent electrodes of the second plurality of electrodes.

12. The input device of claim 10, wherein the capacitive sensing layer further comprises:

a third plurality of electrodes disposed between the second plurality of electrodes in the vertical direction.

13. The input device of claim 12, obtaining the touch output signal further comprises:

obtaining a low ground mass component by performing a second transcapacitance sensing between two of the second plurality of electrodes separated by one of the third plurality of electrodes, while the third plurality of electrodes is held to a ground potential; and removing the low ground mass component from at least one of the plurality of touch signal.

14. The input device of claim 9, wherein each of the first plurality of electrodes comprises first extensions in the horizontal direction, and wherein each of the second plurality of electrodes comprises cutouts corresponding to the first extensions.

15. The input device of claim 9, wherein the capacitive sensing layer is a single layer metal mesh.

16. The input device of claim 9, further comprising a stack of display layers, and wherein the capacitive sensing layer is aligned with the stack of display layers to form a touch screen.

17. A method for operating an input device, wherein the input device comprises:

a capacitive sensing layer comprising:

a first plurality of electrodes, a second plurality of electrodes, and a third plurality of electrodes, in a substantially rectangular sensor pattern, wherein each of the first plurality of electrodes comprises a strip extending in the vertical direction, and wherein the first plurality of electrodes is separated in the horizontal direction by a first plurality of gaps, wherein the first plurality of electrodes comprises sensing elements with multiple horizontal lengths and with vertical extensions, wherein each of the second plurality of electrodes comprises a substantially rectangular pad, disposed adjacent to one of the first plurality of electrodes, in one of the first plurality of gaps, wherein two of the second plurality of electrodes are disposed horizontally in each of the first plurality of gaps in the horizontal direction, wherein the two of the second plurality of electrodes in each of the first plurality of gaps are separated by a second plurality of gaps, wherein a subset of the second plurality of electrodes is disposed in each of the first plurality of gaps, in the vertical direction, wherein the third plurality of electrodes is disposed between the second plurality of electrodes in the vertical direction, and wherein the second plurality of electrodes are separated by a third plurality of gaps in the horizontal direction and into which are disposed the first plurality of electrodes, a plurality of routing traces of the second plurality of electrodes disposed in the second plurality of gaps, wherein the first and second plurality of electrodes and the plurality of routing traces are disposed in a same layer of the substantially rectangular sensor pattern, wherein an electrode of the second plurality of electrodes comprises a height in the vertical direction that is an integer multiple of a length in the horizontal direction of the electrode, wherein the first plurality of electrodes and the second plurality of electrodes establishes a sensing grid, and wherein the sensing grid is rotated with respect to the horizontal direction and the vertical direction; and the method comprising:

obtaining a low ground mass component by performing a first transcapacitance sensing between two of the second plurality of electrodes separated by one of the third plurality of electrodes;

obtaining touch signals by performing a second transcapacitance sensing between the first plurality of electrodes and the second plurality of electrodes;

adjusting the touch signals using the low ground mass components; and generating a touch output signal by processing the plurality of touch signals.

18. The method of claim 17, further comprising:

holding the third plurality of electrodes to a ground potential, while performing the first transcapacitance sensing.

* * * * *